United States Patent [19]

Hoftiezer et al.

[11] 4,455,257

[45] Jun. 19, 1984

[54] CATIONIC REACTION PRODUCT OF KRAFT LIGNIN WITH ALDEHYDE AND POLYAMINE

[75] Inventors: Henry W. Hoftiezer, Rothschild, Wis.; Daniel J. Watts, Kingston, N.J.; Akio Takahashi, Solebury, Pa.

[73] Assignee: Reed Lignin, Inc., Greenwich, Conn.

[21] Appl. No.: 433,991

[22] Filed: Oct. 12, 1982

[51] Int. Cl.$^3$ .................................................. C07G 1/00
[52] U.S. Cl. ................................................. 260/124 R
[58] Field of Search ........................................ 260/124

[56] References Cited

U.S. PATENT DOCUMENTS

| | | | |
|---|---|---|---|
| 2,709,696 | 5/1955 | Wiest | 260/124 |
| 3,126,350 | 3/1964 | Borgfeldt | 260/124 |
| 3,784,493 | 1/1974 | Giguere et al. | 260/124 |
| 4,017,419 | 4/1977 | Ludwig et al. | 260/124 |

*Primary Examiner*—Delbert R. Phillips

[57] ABSTRACT

Cationic reaction products having improved flocculating performance for suspended solids are obtained by the reaction of kraft lignin with aldehydes and polyamines.

12 Claims, No Drawings

CATIONIC REACTION PRODUCT OF KRAFT LIGNIN WITH ALDEHYDE AND POLYAMINE

FIELD OF INVENTION

This invention relates to novel cationic reaction products obtained by reacting kraft lignin with aldehydes and polyamines and is particularly related to new and improved cationic flocculants which consist of the reaction products of kraft lignin with formaldehyde and polyamines.

BACKGROUND OF INVENTION

Organic flocculants have, in recent years, received considerable attention as replacements for inorganic flocculants. The reason is, as mentioned in U.S. Pat. No. 4,155,847, that even though inorganic flocculants (e.g., aluminum sulfate, polyaluminum chloride, ferrous sulfate and ferric chloride) are less expensive than organic flocculants, their use involves several disadvantages. Generally, inorganic flocculants must be used in large amounts, often several times the amount of organic flocculants. When used in sludge treatment, after concentration and dewatering, the sludge will contain large amounts of metal oxide or metal hydroxide even after further treatment, such as burning. This results in production of large quantities of ash with its concomitant disposal problem.

The aforementioned U.S. Pat. No. 4,155,847 discloses cationic flocculants which are water-soluble polycondensates of epihalohydrin and amines. These flocculants are said to be useful for flocculation of various types of suspensions such as, for example, industrial waste waters and pulp slurry obtained in paper making. The flocculants described in the patent, however, are not lignin based products.

U.S. Pat. No. 3,784,493 discloses the Mannich reaction products of acidified spent sulfite liquor with amines (both monoamines and polyamines) and formaldehyde. The resulting products are stated to be useful as setting control agents for cements, hydration shale inhibitors and fillers for resins.

U.S. Pat. No. 4,017,419 describes cationic bitumin or asphalt emulsions stabilized with polyamine-lignin reaction products.

U.S. Pat. No. 4,017,475 describes high molecular weight flocculating agents obtained by reacting lignosulfonate or spent sulfite liquor with phenol, followed by the reaction of the hydroxyphenylated lignosulfonate with ammonia, primary amines or secondary amines.

Other patents of interest include U.S. Pat. Nos. 2,581,035; 2,709,696; 2,731,425; 2,859,186; 2,863,780; 3,538,071; 3,671,428; 3,697,497; 3,871,893 and 3,912,706. While this list is by no means exhaustive, it is representative of efforts of the prior art workers in this field. So far as it is known, however, there is still a need for a truly effective economical organic flocculant today which meets the ever increasing industrial demand. This invention, therefore, is aimed at providing a novel and effective organic flocculant which satisfies long felt industrial requirements for efficient and economical flocculating agents.

Accordingly, it is an object of the present invention to provide novel and improved organic cationic flocculants obtained by reacting kraft lignin with aldehydes and polyamines.

It is also an object of this invention to provide such organic cationic flocculants which are useful for the removal of suspended solids from waste water and the like.

The foregoing and other objects of this invention will become more apparent from the ensuing detailed description and the several examples.

SUMMARY OF INVENTION

Novel lignin derivatives are obtained by reacting kraft lignin with aldehydes and polyamines by the Mannich reaction. The products are cationic and exhibit remarkably improved flocculating performance for kaolin suspensions compared with similar reaction products using sulfonated lignin or other lignosulfonates instead of kraft lignin.

DETAILED DESCRIPTION OF THE INVENTION

It has now been unexpectedly discovered that when kraft lignin is reacted with an aldehyde, particularly formaldehyde, and a polyamine, the resulting product, which is cationic in character, is extremely effective as a flocculant for clay (e.g., kaolin).

Kraft lignin is a by-product of the so-called kraft process in paper making. It is soluble in water under basic conditions but is insoluble under acidic conditions. Also, kraft lignin does not contain any sulfonic acid group and has an extremely low sulfur content which is usually less than 1 percent, and is frequently as low as about 0.1 percent. These properties of kraft lignins are to be distinguished from lignosulfonates and sulfonated lignins obtained by the sulfite pulping process wherein lignocellulosic materials are digested with a sulfite or bisulfite, with the resulting residue being a sulfonated pulping liquor commonly referred to as "spent sulfite liquor". These sulfonated lignins are generally soluble under both basic and acidic aqueous media, contain as much as 5 percent or more sulfonic acid groups in the lignin molecule and have a sulfur content as high as about 3–4 percent or even higher.

In accordance with this invention, it has been found that remarkably effective cationic flocculants are obtained when kraft lignin is reacted with an aldehyde, particularly formaldehyde, and a polyamine by the so-called Mannich reaction, with optimum flocculation efficiency being achieved by a proper selection of the ratio of kraft lignin to the polyamine during the reaction.

The aldehydes which are suitable for reaction with kraft lignin and polyamines to produce the novel cationic reaction products are those which are at least partly soluble in water. These aldehydes include, but are not limited to, formaldehyde, acetaldehyde, propionaldehyde, furfural and benzaldehyde. From the standpoint of economy and convenience of operation, formaldehyde constitutes the aldehyde of choice.

Various other substances which readily form formaldehyde under the reaction conditions employed herein may be used in lieu of the aldehyde. These include paraformaldehyde, trioxane and hexamethylenetetramine.

The useful polyamines which are reacted with kraft lignin and formaldehyde to produce the novel cationic reaction products are those organic compounds containing two or more amino groups, where at least one of the amino groups is primary or secondary. The preferred polyamines are the water soluble, organic polyamines which may be represented by the following general formula:

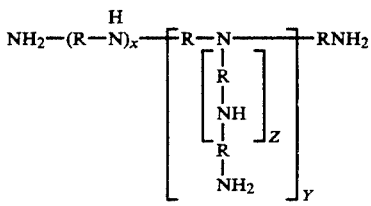

wherein R is an alkylene radical containing 1 to 6 carbon atoms, preferably 1 to 4 carbon atoms; x is an integer of from 0 to about 24, y is an integer of from 0 to 6 and z is also an integer of from 0 to 6, and wherein at least one of the amine groups must be primary or secondary amine group.

The alkylene groups are preferably ethylene, propylene, butylene, and their homologues (both straight-chained and branched-chained), but is, most preferably, ethylene.

Exemplary polyamines which conform to the foregoing general formula include straight-chained and branched-chained primary and secondary polyamines such as polyalkyleneamines and polyalkylene polyamines, e.g., ethylenediamine, diethylenetriamine, triethylenetetramine, tetraethylenepentamine, pentaethylenehexamine, and others, such as, for example, 1, 2- or 1, 3-propanediamine, 1,4-butanediamine, 1,5-pentanediamine, 1,3,5-pentanediamine, and the like. The polyalkylenamines such as ethylenediamine, diethylenetriamine, triethylenetetramine, and tetraethylenepentamine constitute the polyamines of choice in the practice of this invention. Homologues (both linear and branched-chained) of the aforementioned polyalkyleneamines may also be used, if desired. These homologues differ from their respective polyamine by one or more units of $CH_2CH_2N$ and are usually coproduced during the manufacture of the polyalkyleneamines.

In addition, polyamines containing cyclic moieties can also be used in the practice of this invention. Such cyclic-containing polyamines include piperazines, e.g., N-ethylaminopiperazine and the more highly substituted cyclic amino derivatives.

The foregoing and other polyamines which are useful in making the novel products of this invention are described in the aforementioned U.S. Pat. No. 4,017,419 (see column 3, lines 19–66).

The reaction of kraft lignin with aldehyde and the polyamine is generally carried out under reflux conditions (i.e. at about 100° C.) and at ambient pressures. The reaction temperature and pressure may vary somewhat, however, they are not, per se, critical parts of this invention.

As will be illustrated in some of the following examples, the cationic reaction products obtained according to the present invention exhibit optimum flocculation efficiency when the kraft lignin and the polyamine reactants are used in certain critical ratios. This weight ratio may vary from about 1:2 to about 1:0.1 kraft lignin:-polyamine and is preferably from about 1:1 to about 1:0.25, with the most optimum ratio varying depending on the polyamine which is employed.

The optimum amount of the aldehyde varies depending upon the polyamine and the aldehyde employed. When using formaldehyde, for example, the weight ratio of polyamine to formaldehyde can vary from about 1:0.37 to about 1:0.037, preferably from about 1:0.25 to about 1:0.09.

The following examples serve to illustrate the advantages of the cationic reaction products obtained by the present invention. It must be understood, however, that these examples are illustrative only and are not to be construed so as to limit the scope of the invention. Also, the flocculating efficiency of the products of the examples was determined using kaolin clay since it represents a typical system for pollutants with negative charge. Such negatively charged particles represent the majority of suspended solids encountered in water treatment.

EXAMPLE 1

270.9 grams of precipitated softwood kraft lignin containing 46.9 percent by weight solids and 5.6 percent ash (on an as received basis) was slurried in 375 ml. of water. 37.2 grams of 37 percent formaldehyde solution was then added to the slurry and the resulting mixture was agitated for 30 minutes at ambient temperature and at atmospheric pressure. 86.7 grams of Ethyleneamine E-100, a polyamine sold by the Dow Chemical Company, was added to the foregoing mixture with continued agitation and the resulting mixture was refluxed for 2 hours. The resulting solution was cooled to ambient temperature and used as flocculant for koalin clay suspension. The results, together with the results obtained in Examples 2, 3 and 4, are shown in Table I below.

EXAMPLE 2

300 grams of precipitated softwood kraft lignin containing 50.0 percent solids and less than 2 percent ash (on an as received basis) was slurried in 562.5 ml. of water. 55.8 grams of 37 percent formaldehyde solution was added to the slurry and the mixture was agitated for 30 minutes at ambient temperature and pressure. Thereafter, 130.05 grams of tetraethylenepentamine was added with continuous agitation and the resulting mixture was refluxed for 2 hours, cooled to ambient temperature and used as flocculant for kaolin clay suspension.

EXAMPLE 3

207.9 grams of precipitated softwood kraft lignin containing 46.9 precent by weight solids and 5.6 percent ash (on an as received basis) was slurried in 375 ml. of water. 37.2 grams of 37 percent formaldehyde solution was then added to the slurry and the mixture was agitated for 30 minutes at ambient temperature and pressure. 86.7 grams of triethylenetetramine was then added to this mixture under agitation, the resulting mixture refluxed for 2 hours, cooled to ambient temperature and used as flocculant for kaolin clay suspension.

EXAMPLE 4

40 grams of precipitated kraft softwood lignin containing 50.0 percent by weight solids and less than 2 percent ash (on an as received basis) was slurried in 75 ml. of water. 4.46 grams of 37 percent formaldehyde solution was added to the slurry and the resulting mixture agitated for 30 minutes at ambient temperature and pressure. Thereafter, 6.18 grams of 40 percent solution of dimethylamine (a monoamine) in water was added to the mixture and agitation was continued. The resulting mixture was refluxed for 3 hours, cooled to ambient temperature and its pH was adjusted to 5–6 by the addition of 6N hydrochloric acid to precipitate the reaction product. The precipitate was recovered by filtration yielding 47.2 grams of material (50.1 percent solids).

are due to the fact that kaolin clay varies naturally from one batch to another.

TABLE II

| Amount of Product Added, μl of 8% Solids Solution | Turbidities of 0.5% Kaolin Suspension, as ppm of SiO$_2$ | | | | | | |
|---|---|---|---|---|---|---|---|
| | Ratios of Kraft Lignin to Ethyleneamine E-100 | | | | | | Untreated |
| | 1:0.75 | 1:0.56 | 1:0.38 | 1:0.28 | 1:0.19 | 1:0.09 | Suspension |
| 0.5 | 140 | 100 | 100 | 176 | 228 | >3000 | >3000 |
| 1.0 | 92 | 52 | 44 | 92 | 168 | >3000 | >3000 |
| 1.5 | 52 | 40 | 28 | 40 | 68 | >3000 | >3000 |
| 2.0 | 40 | 32 | 28 | 32 | 464 | >3000 | >3000 |

EXAMPLE 5

The solutions obtained in Examples 1, 2 and 3 and the solid material obtained in Example 4 were evaluted as flocculants for kaolin suspension. Thus, different amounts of an 8 percent by weight solution of each of the reaction products obtained in Examples 1-4 were added to 25 ml. of 0.5 percent suspension of kaolin colloid and mixed thoroughly. The solids were allowed to settle for 2 minutes and the turbidity of the supernatant liquid was measured using a Hellige Turbidimeter. The comparative results are shown in Table I wherein low turbidity readings indicate more effective flocculating performance.

TABLE I

| Volume of Sample Added, μl of 8% Solids Solution | Turbidities of 0.5% Kaolin Suspension After Treatment, as ppm of SiO$_2$ | | | | |
|---|---|---|---|---|---|
| | Example 1 | Example 2 | Example 3 | Example 4 | No Treatment |
| 0.5 | 152 | 320 | 228 | >3000 | >3000 |
| 1.0 | 128 | 272 | 144 | >3000 | >3000 |
| 1.5 | 64 | 200 | 72 | >3000 | >3000 |
| 2.0 | 32 | 188 | 60 | >3000 | >3000 |

As shown in Table I, the cationic reaction products of kraft lignin with formaldehyde and polyamines as in Examples 1-3 are considerably more effective flocculants than the reaction product of Example 4 using a monoamine instead of a polyamine.

EXAMPLE 6

This example illustrates the difference in flocculation effectiveness resulting from varying the ratios kraft lignin to polyamine when making the cationic reaction products of this invention.

In this example, the procedure of Example 1 was repeated except that the amounts of Ethyleneamine E-100 and formaldehyde were varied as follows:

| Ratio Lignin:Amine | Quantity of Lignin As Is, in grams | Quantity of 37% Formaldehyde, in grams | Quantity of Ethyleneamine E-100, in grams |
|---|---|---|---|
| 1:0.75 | 270.9 | 37.2 | 86.7 |
| 1:0.56 | 270.9 | 27.9 | 65.0 |
| 1:0.38 | 270.9 | 18.6 | 43.3 |
| 1:0.28 | 270.9 | 14.0 | 32.5 |
| 1:0.19 | 270.9 | 9.3 | 21.7 |
| 1:0.09 | 270.9 | 4.7 | 16.3 |

The cationic reaction products containing different ratios of kraft lignin and polyamine were evaluated as flocculants by the test procedure described in Example 5. The results are shown in Table II below. The differences is turbidity values between Table I and Table II are due to the fact that kaolin clay varies naturally from one batch to another.

From Table II it is apparent that in the case of Ethyleneamine E-100 optimum flocculation is obtained when the ratio of kraft lignin to Ethyleneamine E-100 is between 1:0.56 and 1:0.28. This ratio will vary, of course, for other polyamines and, in general, the ratio of kraft lignin to the polyamines varies from about 1:2 to about 1:0.1, preferably from about 1:1 to about 1:025.

EXAMPLE 7

A product made as in Example 2 was examined by reverse-phase chromatography using a Chromanetics RP-18, 5 μm column; 4 mm inside diameter by 15 centimeter at 35°0 C. The mobile phase was methanol with PIC B-7 and water PIC B-7 in a 35 to 65 ratio. PIC B-7 is a product of Waters Associates, Milford, Mass., used for paired-ion chromatography. Detection of the eluted components was by ultraviolet absorption at 230 nm.

Several chromatograms of the product of Example 2 were compared with chromatograms of the starting polyamine (tetraethylenepentamine). These comparisons showed that any unreacted polyamine in this product comprised less than 0.8 weight percent of the total reaction mixture. Based on 12.5 weight percent of tetraethylenepentamine in the total reaction mixture, at least 93.6 weight percent of the polyamine reactant is incorporated into some new material which is not present as unreacted starting material.

EXAMPLE 8

A product made as in Example 2 was examined by gel permeation chromatography using a TSK-G3000 PW column (7.5 mm×300 mm) from Toyo Soda Company, Tokyo, Japan. The solvent was 5% acetic acid in water, and the entire mixture was 0.2M in sodium chloride, and the flow rate was 1 ml per minute. Detection of eluted components was by ultraviolet absroption at 254 nm. The examination showed a broad peak starting at an elution volume of 7.0 ml. with a maximum at 10.8 ml.

The polyamine (tetraethylenepentamine) used as a reactant in Example 2 showed a narrower peak starting at 11 ml. elution volume with a maximum at 11.9 ml. The ultraviolet absorption of the product of Example 2 was approximately 200 times that of tetraethylenepentamine alone indicating that the ultraviolet absorbing lignin product was incorporated into a new substance having a higher molecular weight than the kraft lignin starting material.

The example illustrates that a new material with properties different than those of the starting materials is formed when kraft lignin is reacted with formaldehyde and polyamine.

EXAMPLE 9

The procedure of Example 1 was repeated except that the softwood kraft lignin was added to a mixture of Ethyleneamine E-100 and water. When the lignin had completely dissolved, the mixture was refluxed and the formaldehyde solution was added dropwise, and heating was continued for a total of 2 hours. It was noted that within 30 minutes after the addition of formaldehyde, the mixture appears to become solid and is no longer a free flowing solution. By contrast in Example 1, the mixture did not solidify. After cooling, the reaction product of Example 9 was dissolved in water with great difficulty.

The cationic reaction products of Examples 1 and 9 were tested as flocculants for kaolin by the procedure described in Example 5. The results are shown in Table III below.

TABLE III

| Amount of Product Added, μl of 8% Solution | Turbidities of 0.5% Kaolin Suspension, as ppm of $SiO_2$ | | |
|---|---|---|---|
| | Example 1 | Example 9 | Untreated Suspension |
| 0.5 | 68 | 112 | >3000 |
| 1.0 | 52 | 64 | >3000 |
| 1.5 | 40 | 44 | >3000 |
| 2.0 | 28 | 24 | >3000 |

As shown in Table III, while the products of Examples 1 and 9 are both effective as flocculants, the product of Example 1 is a more effective flocculant. This indicates that it is more advantageous to add the formaldehyde prior to the addition of the polyamine when making the cationic reaction products of this invention.

EXAMPLE 10

This example illustrates the superior flocculating effectiveness of the cationic products made in accordance with the present invention compared with the flocculating effectiveness of products made by a similar reaction but using different types of lignosulfonates.

The procedure of Example 1 was repeated except that the following lignosulfonates were used instead of kraft lignin:

(a) softwood lignosulfonate which has been desugared by a yeast fermentation.

(b) softwood lignosulfonate which had not been desugared.

(c) hardwood lignosulfonate which had not been desugared.

Table IV shows the results of evaluating the flocculant action of the several products for suspended kaolin using the procedure described in Example 5.

TABLE IV

| Amount of Product Added, μl of 8% Solution | Turbidities of 0.5% Kaolin Suspension After Treatment, as ppm of $SiO_2$ | | | |
|---|---|---|---|---|
| | Kraft Lignin Product | Desugared Softwood Lignosulfonate Product | Non-Desugared Softwood Lignosulfonate Product | Non-Desugared Hardwood Lignosulfonate Product |
| 0.5 | 68 | >3000 | >3000 | >3000 |
| 1.0 | 52 | >3000 | >3000 | >3000 |
| 1.5 | 40 | >3000 | >3000 | >3000 |
| 2.0 | 28 | >3000 | >3000 | >3000 |

As is shown in Table IV, products made by the reaction of lignosulfonates (other than kraft lignin) with formaldehyde and polyamine are markedly inferior flocculating agents than the cationic reaction products made according to the present invention using kraft lignin as the starting reactant.

EXAMPLE 11

The procedure of Example 1 was repeated except for using hardwood kraft lignin instead of softwood kraft lignin. Using the procedure of Example 5, the comparative flocculating efficiency of the two products are shown in Table V below.

TABLE V

| Amount of Product Added, μl of 8% Solution | Turbidities of 0.5% Kaolin Suspension After Treatment, as ppm of $SiO_2$ | | |
|---|---|---|---|
| | Softwood Kraft Lignin Product | Hardwood Kraft Lignin Product | No Treatment |
| 0.5 | 72 | 320 | >3000 |
| 1.0 | 32 | 192 | >3000 |
| 1.5 | 24 | 180 | >3000 |
| 2.0 | 16 | 160 | >3000 |

Table V indicates that while the products derived from hardwood kraft lignin are effective as flocculants, they are less effective as flocculants for kaolin suspension than the cationic reaction products obtained by reacting softwood kraft lignin with formaldehyde and polyamine.

The amount of the cationic reaction products of this invention which is effective for removal of suspended solids from waste waters containing the same can vary over a relatively wide range. In general, these flocculants can be used when added to the waste water at levels from about 1 to about 100 parts per million of the flocculant based on the volume of water being treated.

Thus, as it is evident from the foregoing detailed description of the invention and the illustrative examples, novel cationic products are obtained by the Mannich reaction of kraft lignin with aldehydes and polyamines. These cationic products are soluble in water under both acidic and basic conditions and, surprisingly, they exhibit markedly superior flocculating effectiveness compared with similar products obtained by reaction of lignolsulfonates with aldehydes and polyamines.

What is claimed is:

1. Cationic lignin derivative consisting essentially of the reaction product of kraft lignin which is substantially free from sulfonic acid groups with an aldehyde or an aldehyde-producing substance, and a polyamine.

2. Cationic lignin derivative as in claim 1 wherein said polyamine contains at least two amino groups, at least one of which is primary or secondary amino group.

3. Cationic lignin derivative as in claim 1 wherein said polyamine is polyalkyleneamine.

4. Cationic lignin derivative as in claim 1 wherein said polyamine is a cyclic polyamine.

5. Cationic lignin derivative as in claim 3 wherein said polyalkyleneamine is selected from the group consisting of ethylenediamine and linear and branched homologues of ethylenediamine, wherein said homologues contain at least one additional $CH_2CH_2N$ moiety.

6. Cationic lignin derivative as in claim 1, wherein said aldehyde is formaldehyde.

7. Cationic lignin derivative as in claim 2 wherein said aldehyde is formaldehyde.

8. Cationic lignin derivative as in claim 3 wherein said aldehyde is formaldehyde.

9. Cationic lignin derivative as in claim 4 wherein said aldehyde is formaldehyde.

10. Cationic lignin derivative as in claim 5 wherein said aldehyde is formaldehyde.

11. Cationic lignin derivative as in claims 1, 2, 3, 4, 5, 6, 7, 8, 9 or 10 wherein the ratio to said lignin to said polyamine is from about 1:2 to about 1:0.1.

12. A process for making a cationic lignin derivative which comprises reaction kraft lignin which is substantially free from sulfonic acid groups with an aldehyde or an aldehyde-producing substance, and a polyamine.

* * * * *